(12) United States Patent
Sullivan et al.

(10) Patent No.: US 11,949,277 B2
(45) Date of Patent: Apr. 2, 2024

(54) CONNECTED DEVICE VEHICLE CHARGING

(71) Applicant: FORD GLOBAL TECHNOLOGIES, LLC, Dearborn, MI (US)

(72) Inventors: Daniel Sullivan, West Bloomfield, MI (US); Brendan Jenkins, Canton, MI (US); Tyler James-Ray Kaldobsky, Canton, MI (US); George Hart Vrampas, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/867,303

(22) Filed: Jul. 18, 2022

(65) Prior Publication Data
US 2024/0022106 A1 Jan. 18, 2024

(51) Int. Cl.
| | |
|---|---|
| *H02J 7/34* | (2006.01) |
| *B60L 55/00* | (2019.01) |
| *G06F 3/0482* | (2013.01) |
| *G06F 3/0484* | (2022.01) |
| *H02J 7/00* | (2006.01) |
| *H04B 1/3822* | (2015.01) |

(52) U.S. Cl.
CPC ............ *H02J 7/342* (2020.01); *G06F 3/0482* (2013.01); *G06F 3/0484* (2013.01); *H02J 7/00034* (2020.01); *H02J 7/0048* (2020.01); *H02J 7/0071* (2020.01); *H02J 7/00712* (2020.01); *H04B 1/3822* (2013.01); *B60L 55/00* (2019.02)

(58) Field of Classification Search
CPC ...... H02J 7/342; H02J 7/00034; H02J 7/0048; H02J 7/0071; H02J 7/00712; G06F 3/0482; G06F 3/0484; H04B 1/3822; B60L 55/00
See application file for complete search history.

(56) References Cited

U.S. PATENT DOCUMENTS

| | | | |
|---|---|---|---|
| 7,813,314 B2 | 10/2010 | Fulknier et al. | |
| 8,970,173 B2 | 3/2015 | Kelty et al. | |
| 9,511,676 B2 | 12/2016 | Loftus et al. | |
| 9,614,585 B2 | 4/2017 | Katar et al. | |
| 9,634,504 B2 | 4/2017 | Wu et al. | |
| 2020/0384878 A1* | 12/2020 | Pontefract | B60L 53/66 |

FOREIGN PATENT DOCUMENTS

GB 2522036 A 7/2015

* cited by examiner

*Primary Examiner* — Lincoln D Donovan
*Assistant Examiner* — Alex W Lam
(74) *Attorney, Agent, or Firm* — Joseph Zane; Brooks Kushman P.C.

(57) ABSTRACT

Controlling charging of connected devices is provided. Presence of a target connected device is detected using a wireless transceiver of a vehicle. Settings indicative of how to charge the target connected device via a power connector of the vehicle are received a user interface presented to an HMI of the vehicle. Data packets from the target connected device indicative of a current state of charge of the target connected device are received using the wireless transceiver. The target connected device is charged from the power connector in accordance with the settings and the current state of charge.

21 Claims, 8 Drawing Sheets

| Header Information 302 | Device Information 304 | Charge Status 306 | Error Flag 308 |

| Header Information 402 | Vehicle Information 404 | Charge Information 406 | Con't Flag 408 |

CONNECTED DEVICE VEHICLE CHARGING

TECHNICAL FIELD

Aspects of the disclosure relate to charging connected devices using a vehicle.

BACKGROUND

A vehicle may be used to charge a recreational vehicle (RV) while driving. For example, the RV may be connected to the vehicle's alternator while the vehicle is trailing the RV. Vehicles may also be used to charge other devices, such as cell phones or tablet computers. This may be done, for instance, using wired universal serial bus (USB) connections or wireless charging pads.

SUMMARY

In one or more illustrative examples, a vehicle for controlling charging of connected devices is provided. The vehicle includes a human machine interface (HMI), a wireless transceiver, a power connector, and a controller. The controller is programmed to detect, using the wireless transceiver, presence of a target connected device, receive, via a user interface presented to the HMI, settings indicative of how to charge the target connected device via the power connector, receive, using the wireless transceiver, data packets from the target connected device indicative of a current state of charge of the target connected device, and charge the target connected device from the power connector in accordance with the settings and the current state of charge.

In one or more illustrative examples, a method for controlling charging of connected devices is provided. Presence of a target connected device is detected using a wireless transceiver of a vehicle. Settings indicative of how to charge the target connected device via a power connector of the vehicle are received a user interface presented to an HMI of the vehicle. Data packets from the target connected device indicative of a current state of charge of the target connected device are received using the wireless transceiver. The target connected device is charged from the power connector in accordance with the settings and the current state of charge.

In one or more illustrative examples, a non-transitory computer-readable medium includes instructions for controlling charging of connected devices that, when executed by a controller of a vehicle, cause the vehicle to perform operations including to detect, using a wireless transceiver of a vehicle, presence of a target connected device; receive, via a user interface presented to an HMI of the vehicle, settings indicative of how to charge the target connected device via a power connector of the vehicle; receive, using the wireless transceiver, data packets from the target connected device indicative of a current state of charge of the target connected device; and charge the target connected device from the power connector in accordance with the settings and the current state of charge.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Charging external devices may require a data connection for charge status and a power connection to transfer the power to the device. However, data lines may be expensive to run to every port on a vehicle. Instead of doing so, built-in Wi-Fi or other wireless network facilities of the vehicle may be used to create an internal network to wirelessly transfer charging-specific data between devices connected to the vehicle. Since the network is internal to the vehicle, no connection to an external cellular network is required. Network policies or techniques may be created to support the charging devices. This may give the user more control over devices being charged.

Figure 1:
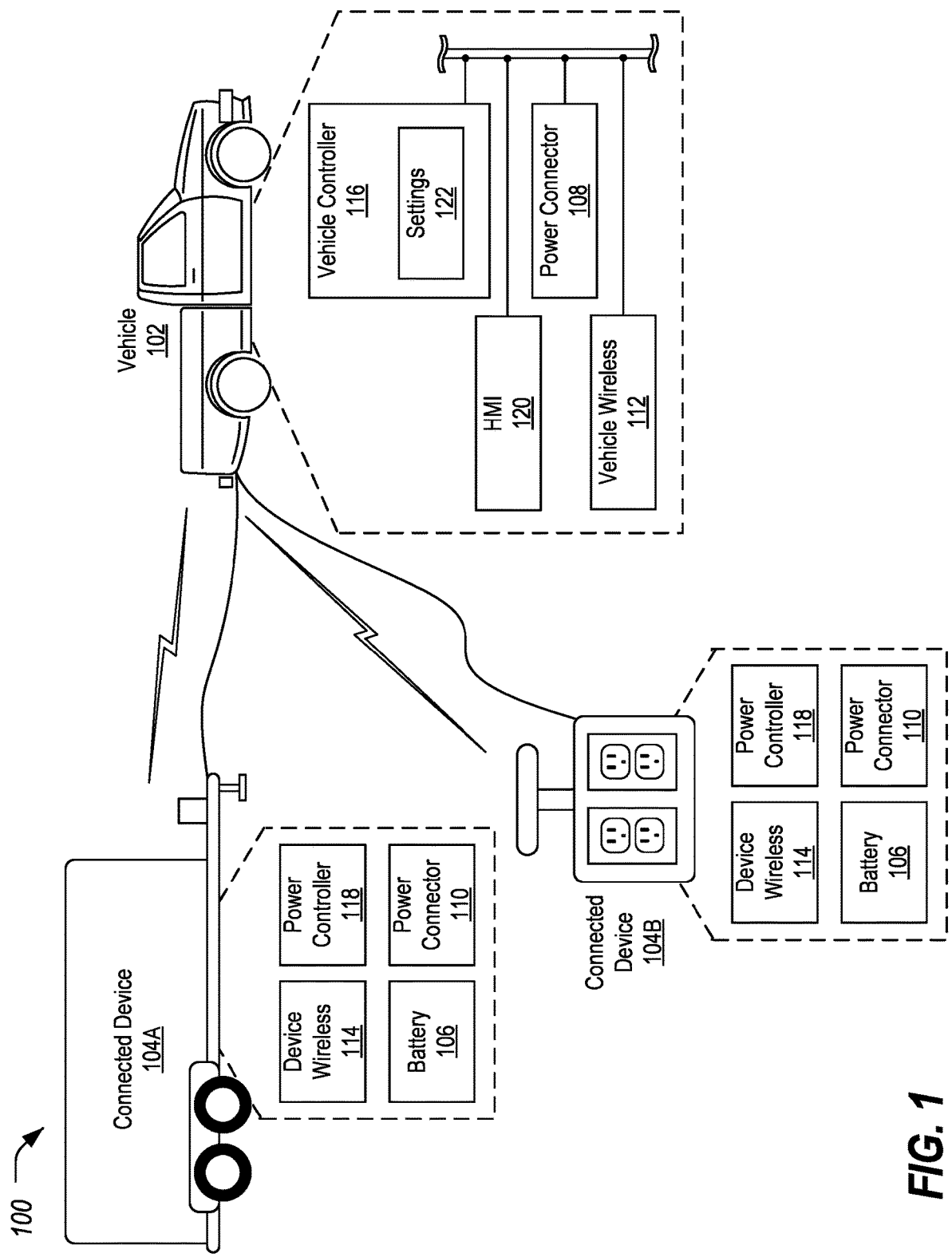
FIG. 1 illustrates an example system for the networked charging of connected devices by a vehicle.

FIG. 1 illustrates an example system 100 for the networked charging of connected devices 104 by a vehicle 102. The vehicle 102 may include various types of automobile, crossover utility vehicle (CUV), sport utility vehicle (SUV), truck, boat, plane or other mobile machine for transporting people or goods. In many cases, the vehicle 102 may be a battery electric vehicle (BEV) powered by a traction battery and one or more electric motors. As a further possibility, the vehicle 102 may be a hybrid electric vehicle powered by both an internal combustion engine, a traction battery, and one or more electric motors. Hybrid vehicles 102 may come in various forms, such as a series hybrid electric vehicle, a parallel hybrid electrical vehicle, or a parallel/series hybrid electric vehicle. As the type and configuration of vehicle 102 may vary, the capabilities of the vehicle 102 may correspondingly vary. As some possibilities, vehicles 102 may have different capabilities with respect to passenger capacity, towing ability and capacity, and storage volume. For title, inventory, and other purposes, vehicles 102 may be associated with unique identifiers, such as vehicle identification numbers (VINs), globally unique identifiers (GUIDs), customer or fleet accounts, etc.

The connected devices 104 may include various devices having rechargeable batteries 106 that may be charged from the vehicle 102. In an example, the connected device 104 may be an RV, such as shown with connected device 104A. In another example, the connected device 104 may be a battery box device configured to offer outlets for the powering of other devices, such as shown with connected device 104B.

A power connection may be formed between a power connector 108 of the vehicle 102 and a device power connector 110 of the connected device 104. The connected devices 104 may receive electrical power via the power connection to power their respective batteries 106. The power connector 108 may provide direct current (DC) or alternating current (AC) electric power to the connected device 104. A cable may have a charge connector for plugging into a respective power connector 108 of the vehicle 102 and of the device power connector 110. The power connector 108 and/or device power connector 110 may be any type of port configured to transfer power from the vehicle 102 to the connected devices 104. Alternatively, the vehicle 102 may be configured to transfer power to the connected devices 104 using other approaches, such as a wireless inductive coupling.

A wireless control connection may be made between a vehicle wireless transceiver 112 of the vehicle 102 and a device wireless transceivers 114 of the connected device 104. This may allow for the vehicle 102 and the connected device 104 to communicate data for controlling the power provided over the power connection. The wireless connection may be formed over various wireless protocols having sufficient communications distance and bandwidth to support the communications between the vehicle 102 and the connected device 104, such as Wi-Fi, BLUETOOTH, and the like. As the control connection is wireless, wired data lines to each power connector 108 may be avoided.

The vehicles 102 and connected devices 104 may include circuitry and controls to regulate and manage the transfer of energy between the power source and the vehicle 102. Charging of the connected device 104 may be controlled on the vehicle 102 side of the power and wireless connections via a vehicle controller 116. Charging of the connected device 104 may be controlled on the connected device 104 side of the power and wireless connections via a device controller 118. The vehicle controller 116 and device controller 118 may be any of various types of computing device including one or more processors configured to execute computer instructions, and a storage medium on which the computer-executable instructions and/or data may be maintained. Using the vehicle controller 116 and/or the device controller 118 the vehicle 102 and/or connected devices 104 may be configured to regulate and manage the transfer of energy between the vehicle 102 and the connected devices 104.

The vehicle 102 may also include a HMI 120. The HMI 120 may include various displays, such as a screen in a center stack of the vehicle 102 cabin. The HMI 120 may also include one or more speakers for providing audio output to a user. The HMI 120 may also include facilities for receiving input, such as one or more buttons, controls, touch screens, microphones, etc. As discussed in detail herein, the device controller 118 may maintain settings 122 descriptive of various aspects of how to charge the connected devices 104. These settings 122 may be configurable using the HMI 120 as shown in detail below.

Figure 2:
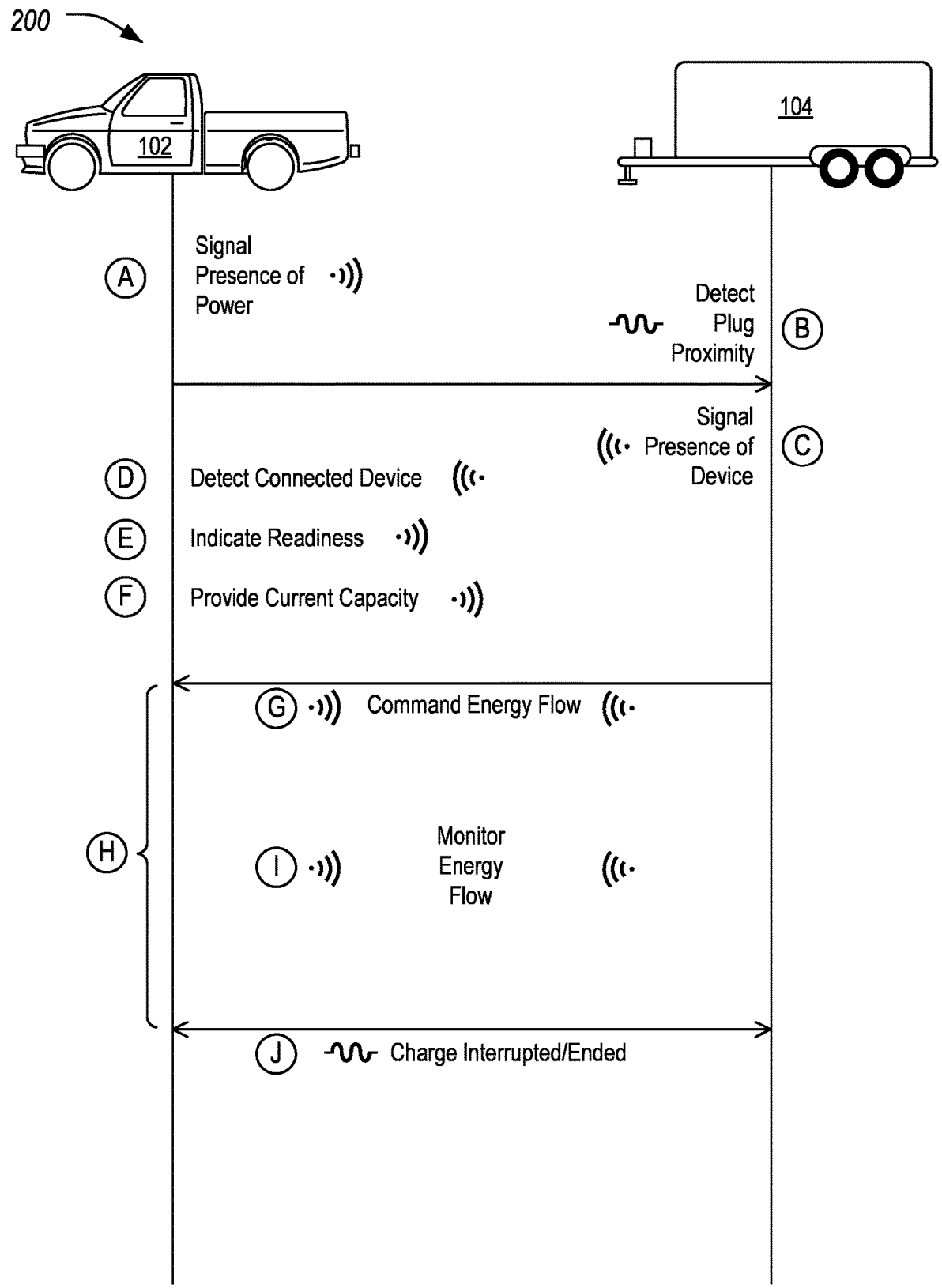
FIG. 2 illustrate an example data flow of the charging of a connected device via the vehicle.

FIG. 2 illustrate an example data flow 200 of the charging of a connected device 104 via the vehicle 102. As shown, the data flow 200 include aspects that may be communicated wirelessly between the vehicle wireless transceiver 112 and the device wireless transceiver 114. These are indicated by a wireless symbol. The data flow 200 also includes aspects that involve the power connection between the vehicle 102 and the connected device 104. These are indicated by a wired symbol.

More specifically, as shown at index (A), the data flow 200 may initiate with the vehicle 102 wirelessly signaling the availability of power. This may be provided by the vehicle 102, for example, if the vehicle 102 has sufficient battery capacity to charge the connected device 104 and/or if the vehicle 102 is an internal combustion engine (ICE) vehicle 102 if the engine is in operation.

At index (B), the connected device 104 may detect the power connector 108 plug. This may be accomplished, in an example, via a proximity circuit. For instance, the device controller 118 may activate responsive to detection of a pin of a cable to the connected device 104 touching the power connector 108. Responsive to activation of the device controller 118, as shown at index (C) the device controller 118 may wirelessly broadcast information indicative of presence of the device controller 118 to the vehicle controller 116.

Figure 3:
FIG. 3 illustrates an example data packet broadcast by the device wireless transceiver of the connected device.

FIG. 3 illustrates an example data packet 300 broadcast by the device wireless transceiver 114 of the connected device 104. As shown, the data packet 300 may include a header 302, device information 304, charge status 306, and an error flag 308.

The header 302 may include addressing and other data that is required for the data packet 300 to reach the vehicle 102. In the case of the data packet 300 being a transmission control protocol (TCP) packet, the header 302 may be a TCP header.

The device information 304 may include information about the connected device 104, such as a name of the connected device 104 (e.g., a user configurable name, a factory name, a unique identifier, etc.), a power capacity of the connected device 104 (e.g., how much power the connected device 104 may store), a type of the connected device 104 (e.g., battery, RV, computer, phone, home when the grid power is out, etc.), a current draw of the connected device 104 (e.g., minimum, preferred, and/or maximum current draw).

The charge status 306 may include information such as the level of charge of the connected device 104 (e.g., percentage, charged kW, kW to be charged, etc.) and the rate at which the connected device 104 is being charged (e.g., as measured by the connected device 104, as requested by the connected device 104, etc.).

The error flag 308 may be a value that is set to a first value to indicate that charging may proceed, and that is set to a second value to indicate that charging should not proceed. This error flag 308 may be set, if, for example, a short is detected, the connected device 104 is full, the charge is canceled by the connected device 104, etc.

Referring back to FIG. 2, at index (D) the vehicle 102 detects the transmissions from the connected device 104. In an example, the vehicle wireless transceiver 112 receives one or more data packets 300 transmitted by the device wireless transceiver 114 of the connected device 104. Responsive to receipt of the data packet 300, at index (E) the vehicle 102 indicates readiness to perform charging of the connected device 104. At index (F), the vehicle 102 indicates the current capacity of the vehicle 102 to charge the connected device 104.

Figure 4:
FIG. 4 illustrates an example data packet broadcast by the vehicle wireless transceiver of the vehicle.

FIG. 4 illustrates an example data packet 400 broadcast by the vehicle wireless transceiver 112 of the vehicle 102. As shown, the data packet 400 may include a header 402, vehicle information 404, charge information 406, and an error flag 408.

Similar to the header 302, the header 402 may include addressing and other data that is required for the data packet 400 to reach the connected device 104. In the case of the data packet 400 being a TCP packet, the header 402 may be a TCP header.

The vehicle information 404 may include information about the vehicle 102, such as a name of the connected device 104 (e.g., a user configurable name, a factory name, a unique identifier such as VIN, etc.), a make of the vehicle 102, a model of the vehicle 102, a type of the vehicle 102, available current draw of the vehicle 102 (e.g., or maximum current draw per connected device 104, maximum current draw across all connected devices 104), etc.

The charge information 406 may include information such as the rate of charge of the vehicle 102 is providing for the connected device 104, and optionally pricing or other information with respect to the charge.

The error flag 408 may be a value that is set to a first value to indicate that charging may proceed, and that is set to a second value to indicate that charging should not proceed. This error flag 408 may be set, if, for example, a short is detected by the vehicle 102, the vehicle 102 no longer can provide charge, the charge is canceled by the vehicle 102, etc.

Referring back to FIG. 2, at index (G) the connected device 104 commands the energy flow from the vehicle 102 to the connected device 104 to proceed. This may initiate the charge session, as shown at index (H). During the charge session, the vehicle 102 and connected device 104 may continue to exchange data packets 300 and data packets 400 as the charge session is monitored. The charge may continue until, as shown at index (J), the charge is completed or interrupted. This may be indicated, for example, by the connected device 104 setting the error flag 308 in a data packet 300 sent to the vehicle 102, or by the vehicle 102 setting the error flag 408 in a data packet 400 sent to the connected device 104.

When the connected devices 104 are connected to the vehicle 102, the HMI 120 may be used to allow the user to have precise control over when to start and stop charging the connected device 104. This may include options relating to when to start/stop charging a connected device 104, such as options to start/stop charging a connected device 104 based on time of day, power remaining on the connected device 104, power remaining on the vehicle 102, etc.

This may also include options for manual control of the charging. For instance, the user may utilize the HMI 120 to pause or stop charging for connected devices 104 manually. These connected devices 104 may still remain connected to the vehicle 102 via the wireless connection. As the connected devices 104 may remain connected, the HMI 120 may be used to view charging statistics of those connected devices 104, such as time to complete a charge (e.g., at the current rate), current charge status, etc.

Figure 5:
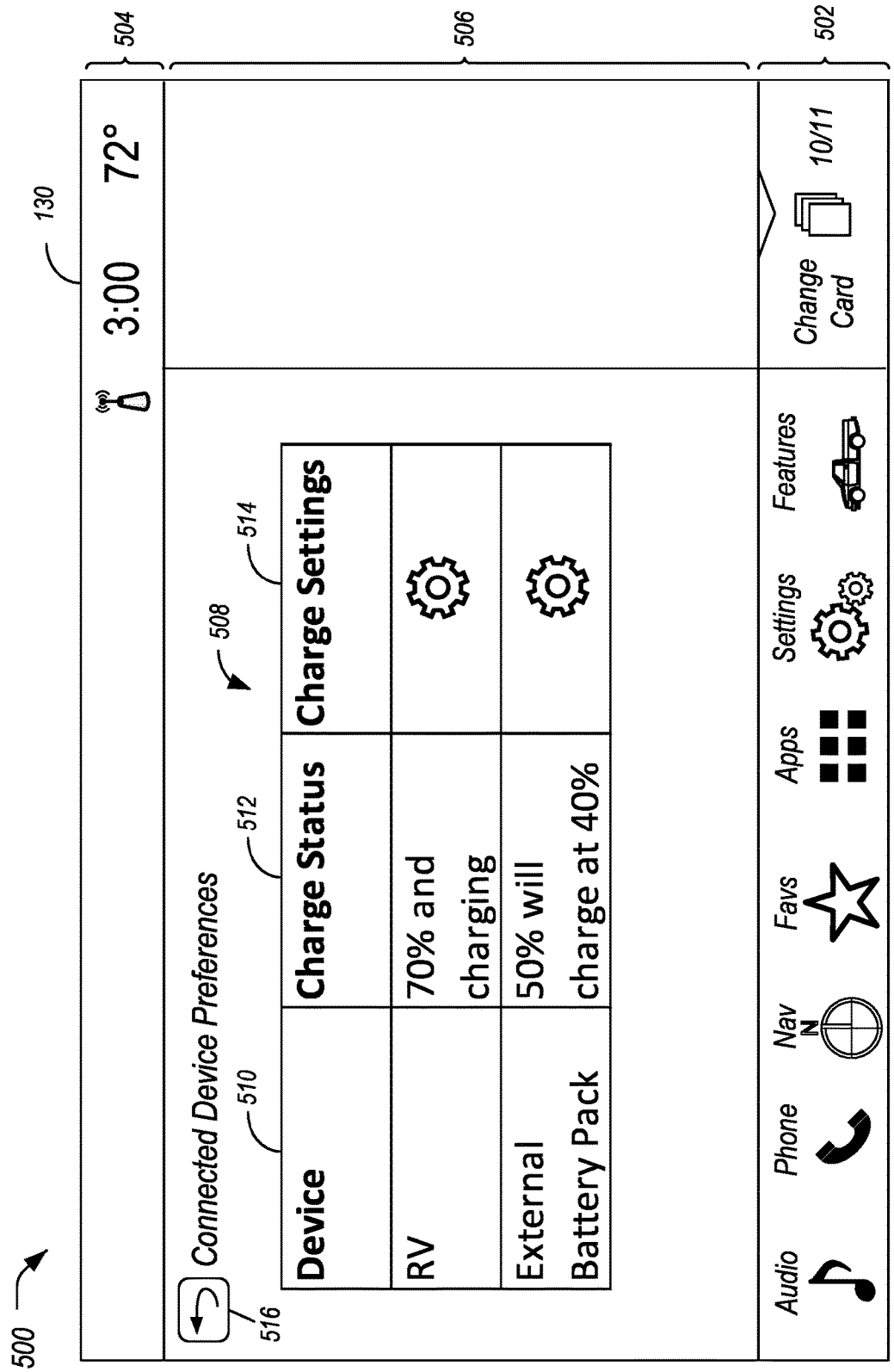
FIG. 5 illustrates an example of the vehicle displaying a user interface illustrating a current charging status of the connected devices.

FIG. 5 illustrates an example of the vehicle 102 displaying a user interface 500 illustrating a current charging status of the connected devices 104. In an example, the user interface 500 may be displayed on a head unit or other HMI 120 of the vehicle 102.

As shown, the user interface 500 includes a category listing 502 of one or more screens of content to be displayed in a main screen area 506 of the HMI 120. As some examples, the category listing 502 may include an audio screen from which configuration of vehicle 102 audio settings may be performed, a phone screen from which calling services may be utilized, a navigation screen from which maps and routing may be performed, a favorites screen from which settings marked as favorites may be easily accessed, an applications screen from which installed applications may be invoked, a settings screen from which backlighting or other general settings of the HMI 120 may be accessed, and a features screen illustrating features of the vehicle 102. The user interface 500 may also include a general information area 504 from which time, current temperature, and other information may remain visible to the user, regardless of the specific screen or application that is active in the main screen area 506.

The main screen area 506 may show content from the selected category of content. In the illustrated example, the user interface 500 may be displayed, for example, responsive to user selection of the settings screen from the category listing 502, and then with further selection of connected devices 104 from the displayed settings screen.

The user interface 500 provides a connected device listing 508 of the connected devices 104 that are connected to the vehicle 102. For each of the connected devices 104, the connected device listing 508 may indicate a name 510 of the connected device 104, a charge status 512 of the connected device 104, and a settings indication 514.

The name 510 of the connected device 104 may correspond to the name indicated in the device information 304 sent by the connected device 104 to the vehicle 102. The charge status 512 may indicate information descriptive of the state of charge of the connected device 104 and/or information with respect to the connected device 104 being charged by the vehicle 102 (e.g., whether the connected device 104 is being charged, any settings 122 relating to the charge rate, timing, etc. for the charging of the connected device 104 by the vehicle 102, etc.).

The settings indication 514, when selected, allows the user to configure aspects of the charging of the connected device 104. This may include, for example, when to start/stop charging a connected device 104, such as options to start/stop charging a connected device 104 based on time of day, power remaining on the connected device 104, power remaining on the vehicle 102, etc. This information, once set, may accordingly be saved to the settings 122 and communicated to the connected device 104 in the data packets 400.

The user interface 500 may also include a go back control 516 that, when selected, allows the user to return to the previous screen that the user was interacting with. In the illustrated example, the go back control 516 may allow the user to return to the settings more generally.

Figure 6:
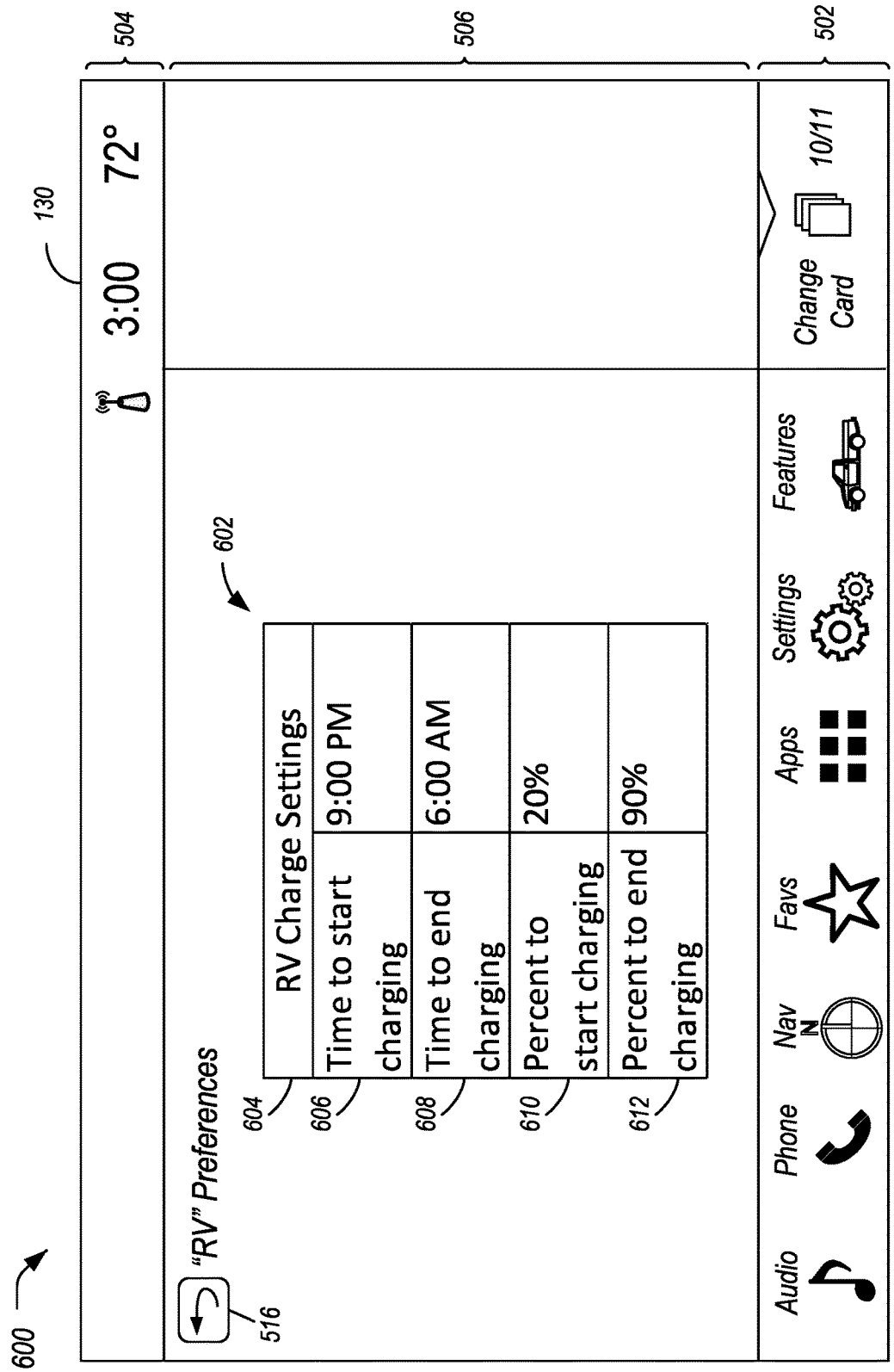
FIG. 6 illustrates an example of the vehicle displaying a user interface illustrating details of the charging settings for a selected one of the connected devices.

FIG. 6 illustrates an example of the vehicle 102 displaying a user interface 600 illustrating details 602 of the charging settings 122 for a selected one of the connected devices 104. In an example, the user interface 600 may be displayed on a head unit or other HMI 120 of the vehicle 102 responsive to a user section of one of the settings indications 514 from the user interface 500. In the illustrated example, the user may have selected the settings indication 514 for the RV connected device 104.

As shown, charge settings 604 for the RV connected device 104 may include a time to start charging 606 and a time to end charging 608. The charge setting 604 may also include a percent or other measure of minimum state of charge 610 of the connected device 104 at which charging may initiated at if the connected device 104 falls below the indicated state of charge. The charge setting 604 may also include a percent or other measure of maximum state of charge 612 of the connected device 104 at which charging may be discontinued at if the connected device 104 reaches the indicated state of charge. This information, once set, may accordingly be saved to the settings 122.

Figure 7:
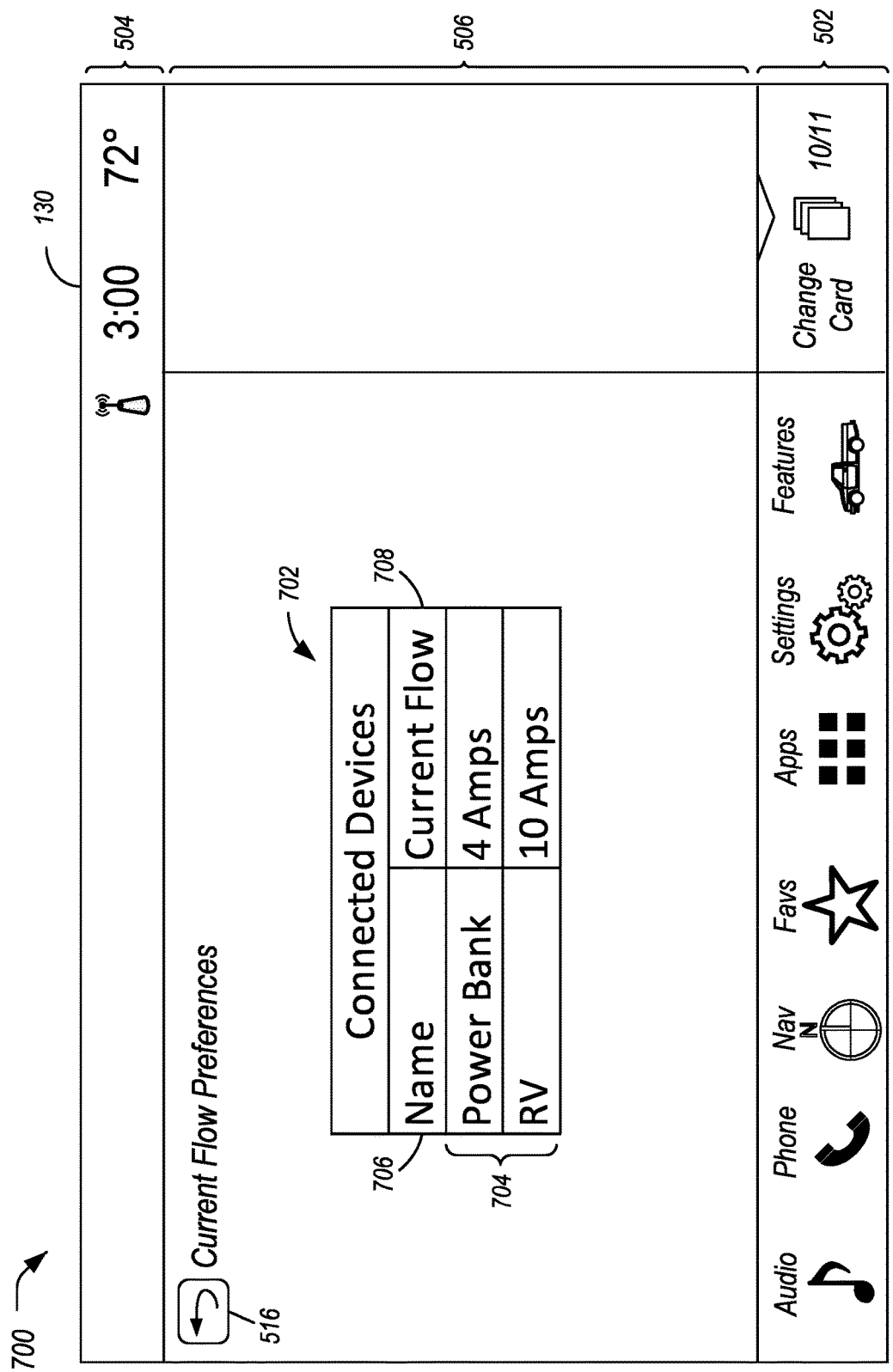
FIG. 7 illustrates an example of the vehicle displaying a user interface illustrating current flow preferences of the charging settings.

FIG. 7 illustrates an example of the vehicle 102 displaying a user interface 700 illustrating current flow preferences 702 of the charging settings 122. In an example, the user interface 600 may be displayed on a head unit or other HMI 120 of the vehicle 102 responsive to a user section of current flow preferences 702 from the user interface 500 or another portion of the main settings user interface.

As shown, the current flow preferences 702 include a connected device listing 704, where for each connected device 104 that is listed, a device name 706 and current flow 708 is indicated. The user interface 700 may therefore allow a user to allocate the available current flow of the vehicle 102 to the different connected devices 104. This may be useful if the user wishes to prioritize the charging of certain connected devices 104 over the charging of other connected devices 104. This information, once set, may accordingly be saved to the settings 122.

Figure 8:
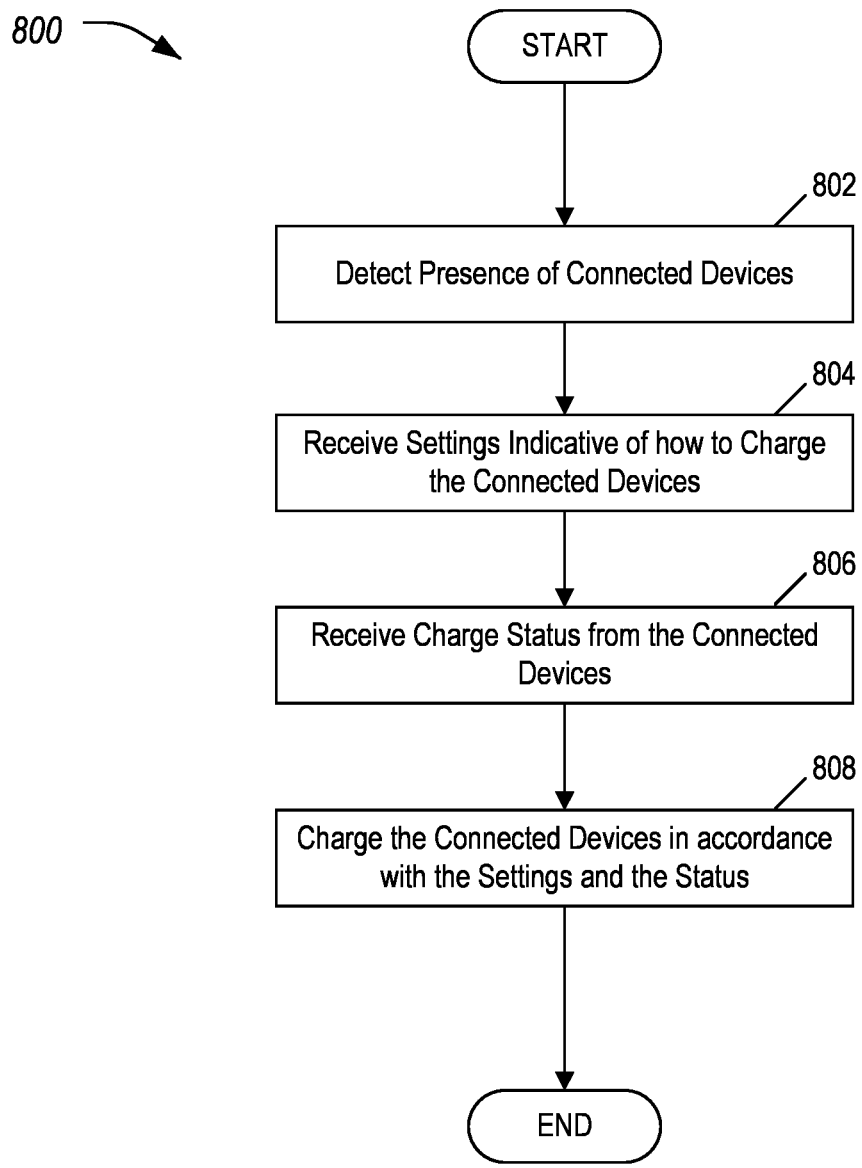
FIG. 8 illustrates an example process for the networked charging of connected devices by the vehicle.

FIG. 8 illustrates an example process 800 for the networked charging of connected devices by the vehicle 102. In an example, the process 800 may be performed by the vehicle 102 the context of the system 100 discussed in detail above.

At operation 802, the vehicle 102 detects presence of connected devices 104. In an example, as discussed with respect to the example data flow 200 of FIG. 2, the vehicle 102 may wirelessly indicate the presence of power for connected devices 104 via the vehicle wireless transceiver 112, and the connected devices 104 may receive the indication and signal their presence to the vehicle 102.

At operation 804, the vehicle 102 receives settings 122 indicative of how to charge the connected devices 104. In an example, these settings 122 may be retrieved from the storage of the vehicle controller 116. In another example, these settings 122 may be configured using the HMI 120, such as via one or more of the user interfaces 500, 600, or 700 discussed above.

At operation 806, the vehicle 102 receives charge status 306 from the connected devices 104. In an example, this charge status 306 may be included in data packets 300 that are wirelessly received by the vehicle wireless transceiver 112 from the device wireless transceivers 114 of the connected devices 104. The data packets 300 may be sent by the connected devices 104 periodically, in an example. Or, the data packets 300 may be sent by the connected devices 104 responsive to an update request from the vehicle 102, in another example.

At operation 808, the vehicle 102 charges the connected devices 104 in accordance with the settings 122 and the charge status 306. This may include, in an example, to initiate the charge of the connected device 104 from the power connector 108 responsive to the current state of charge of the connected device 104 being less than the minimum state of charge 610. This may also include, in another example, to initiate the charge of the connected device 104 from the power connector 108 responsive to the time being indicated as a start time for charging the connected device 104. This also may include, in another example, to discontinue the charge of the connected device 104 from the power connector 108 responsive to the current state of charge of the connected device 104 being greater than the maximum state of charge 612. This also may include, in another example, to discontinue the charge of the connected device 104 from the power connector 108 responsive to the time being a stop time for charging the connected device 104. After operation 808, the process 800 ends.

Figure 9:
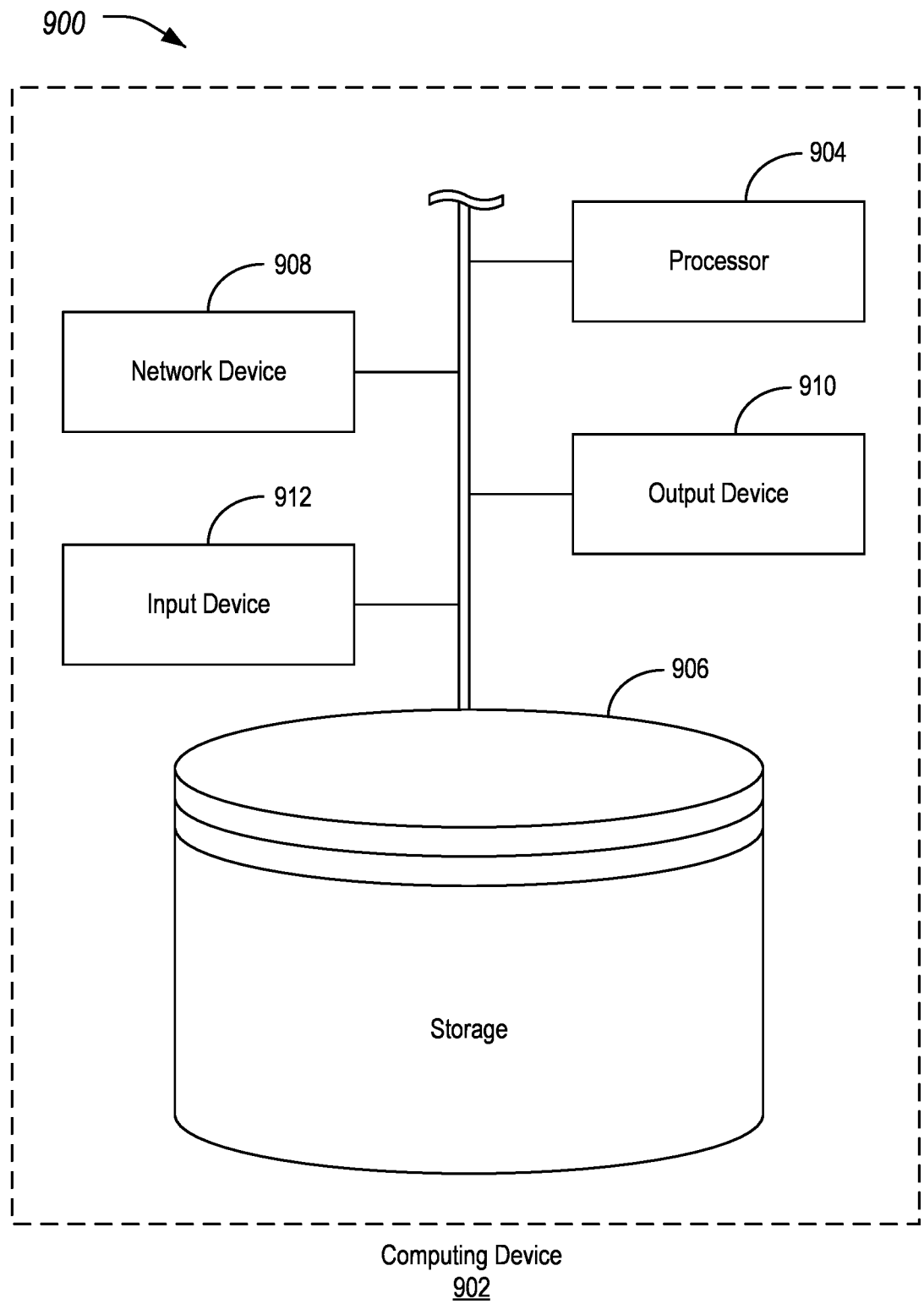
FIG. 9 illustrates an example computing device for use in the networked charging of connected devices by a vehicle.

FIG. 9 illustrates an example computing device 902 for use in the networked charging of connected devices 104 by a vehicle 102. Referring to FIG. 9, and with reference to FIGS. 1-8, the vehicles 102 and computing devices 902 generally include computer-executable instructions, where the instructions may be executable by one or more computing devices 902. Computer-executable instructions may be compiled or interpreted from computer programs created using a variety of programming languages and/or technologies, including, without limitation, and either alone or in combination, Java™, C, C++, C #, Visual Basic, JavaScript, Python, JavaScript, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data, such as the data packets 300, data packets 400, and settings 122 for charging the connected devices 104 may be stored and transmitted using a variety of computer-readable media.

As shown, the computing device 902 may include a processor 904 that is operatively connected to a storage 906, a network device 908, an output device 910, and an input device 912. It should be noted that this is merely an example, and computing devices 902 with more, fewer, or different components may be used.

The processor 904 may include one or more integrated circuits that implement the functionality of a central processing unit (CPU) and/or graphics processing unit (GPU). In some examples, the processors 904 are a system on a chip (SoC) that integrates the functionality of the CPU and GPU. The SoC may optionally include other components such as, for example, the storage 906 and the network device 908 into a single integrated device. In other examples, the CPU and GPU are connected to each other via a peripheral connection device such as Peripheral Component Interconnect (PCI) express or another suitable peripheral data connection. In one example, the CPU is a commercially available central processing device that implements an instruction set such as one of the x86, ARM, Power, or Microprocessor without Interlocked Pipeline Stages (MIPS) instruction set families.

Regardless of the specifics, during operation the processor 904 executes stored program instructions that are retrieved from the storage 906. The stored program instructions, accordingly, include software that controls the operation of the processors 904 to perform the operations described herein. The storage 906 may include both non-volatile memory and volatile memory devices. The non-volatile memory includes solid-state memories, such as Not AND (NAND) flash memory, magnetic and optical storage media, or any other suitable data storage device that retains data when the system is deactivated or loses electrical power. The volatile memory includes static and dynamic random access memory (RAM) that stores program instructions and data during operation of the system 100.

The GPU may include hardware and software for display of at least two-dimensional (2D) and optionally three-dimensional (3D) graphics to the output device 910. The output device 910 may include a graphical or visual display device, such as an electronic display screen, projector, printer, or any other suitable device that reproduces a graphical display. As another example, the output device 910 may include an audio device, such as a loudspeaker or headphone. As yet a further example, the output device 910 may include a tactile device, such as a mechanically raiseable device that may, in an example, be configured to display braille or another physical output that may be touched to provide information to a user.

The input device 912 may include any of various devices that enable the computing device 902 to receive control input from users. Examples of suitable input devices 912 that receive human interface inputs may include keyboards, mice, trackballs, touchscreens, microphones, graphics tablets, and the like.

The network devices 908 may each include any of various devices that enable the described components to send and/or receive data from external devices over networks. Examples of suitable network devices 908 include an Ethernet interface, a Wi-Fi transceiver, a cellular transceiver, or a BLUETOOTH or BLE transceiver, or other network adapter or peripheral interconnection device that receives data from another computer or external data storage device, which can be useful for receiving large sets of data in an efficient manner.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A vehicle for controlling charging of connected devices, comprising:
   a human machine interface (HMI) of the vehicle;
   a wireless transceiver of the vehicle;
   a power connector of the vehicle; and
   a controller of the vehicle, programmed to:
      detect, using the wireless transceiver, presence of a target connected device,
      receive, via a user interface presented to the HMI, settings indicative of how to charge the target connected device via the power connector,
      receive, using the wireless transceiver, data packets from the target connected device indicative of a current state of charge of the target connected device, and
      charge the target connected device from the power connector in accordance with the settings and the current state of charge, and
      display, in the HMI, a listing of a plurality of connected devices, the plurality of connected devices including the target connected device, where, for each of the plurality of connected devices the HMI displays a name of the respective connected device, the state of charge of the respective connected device, an indication of whether the respective connected device is currently being charged, and if the respective connected device is not currently being charged, a description of the settings that, when met, would cause the respective connected device to be charged.

2. The vehicle of claim 1, wherein the description of the settings that, when met, would cause the connected device to be charged includes the state of charge of the connected device below which charging of the connected device would be initiated.

3. The vehicle of claim 1, wherein the state of charge of the respective connected device further indicates the state of charge of the connected device above which charging of the connected device will be discontinued.

4. The vehicle of claim 1, where the controller is further programmed to display, in the HMI, a settings indication corresponding to each of the plurality of connected devices in the listing, wherein responsive to being selected, the HMI displays options to configure aspects of charging of the respective connected device, the options including one or more of:
   a start time of day at which to begin charging the respective connected device,
   an end time of day at which to end charging the respective connected device, a minimum state of charge of the respective connected device below which to begin charging the respective connected device, or a maximum state of charge of the target connected device above which to begin charging the respective connected device.

5. The vehicle of claim 1, wherein the settings include a minimum state of charge of the target connected device below which to begin charging the target connected device, and the controller is further programmed to initiate the charge of the target connected device from the power connector responsive to the current state of charge of the target connected device being less than the minimum state of charge.

6. The vehicle of claim 1, wherein the settings include a maximum state of charge of the target connected device above which to begin charging the target connected device, and the controller is further programmed to discontinue the charge of the target connected device from the power connector responsive to the current state of charge of the target connected device being greater than the maximum state of charge.

7. A vehicle for controlling charging of connected devices, comprising:
  a human machine interface (HMI) of the vehicle;
  a wireless transceiver of the vehicle;
  a power connector of the vehicle; and
  a controller of the vehicle, programmed to:
    detect, using the wireless transceiver, presence of a target connected device,
    receive, via a user interface presented to the HMI, settings indicative of how to charge the target connected device via the power connector,
    receive, using the wireless transceiver, data packets from the target connected device indicative of a current state of charge of the target connected device,
    charge the target connected device from the power connector in accordance with the settings and the current state of charge, and
    display, in the HMI, a listing of a plurality of connected devices, the plurality of connected devices including the target connected device, where, for each of the plurality of connected devices the HMI displays a name of the respective connected device, and a configurable current flow that the respective connected device receives when being charged.

8. A method for controlling charging of connected devices, comprising:
  detecting, using a wireless transceiver of a vehicle, presence of a target connected device;
  receiving, via a user interface presented to an HMI of the vehicle, settings indicative of how to charge the target connected device via a power connector of the vehicle;
  receiving, using the wireless transceiver, data packets from the target connected device indicative of a current state of charge of the target connected device; and
  charging the target connected device from the power connector in accordance with the settings and the current state of charge; and
  displaying, in the HMI, a listing of a plurality of connected devices, the plurality of connected devices including the target connected device, where, for each of the plurality of connected devices the HMI displays a name of the respective connected device, the state of charge of the respective connected device, an indication of whether the respective connected device is currently being charged, and if the respective connected device is not currently being charged, a description of the settings that, when met, would cause the respective connected device to be charged.

9. The method of claim 8, wherein the description of the settings that, when met, would cause the connected device to be charged includes the state of charge of the connected device below which charging of the connected device would be initiated.

10. The method of claim 8, wherein the state of charge of the respective connected device further indicates the state of charge of the connected device above which charging of the connected device will be discontinued.

11. The method of claim 8, further comprising displaying, in the HMI, a settings indication corresponding to each of the plurality of connected devices in the listing, wherein responsive to being selected, the HMI displays options to configure aspects of charging of the respective connected device, the options including one or more of:
  a start time of day at which to begin charging the respective connected device,
  an end time of day at which to end charging the respective connected device,
  a minimum state of charge of the respective connected device below which to begin charging the respective connected device, or
  a maximum state of charge of the target connected device above which to begin charging the respective connected device.

12. The method of claim 8, wherein the settings include a minimum state of charge of the target connected device below which to begin charging the target connected device, and further comprising initiating the charge of the target connected device from the power connector responsive to the current state of charge of the target connected device being less than the minimum state of charge.

13. The method of claim 8, wherein the settings include a maximum state of charge of the target connected device above which to begin charging the target connected device, and further comprising discontinuing the charge of the target connected device from the power connector responsive to the current state of charge of the target connected device being greater than the maximum state of charge.

14. A method for controlling charging of connected devices, comprising:
  detecting, using a wireless transceiver of a vehicle, presence of a target connected device:
  receiving, via a user interface presented to an HMI of the vehicle, settings indicative of how to charge the target connected device via a power connector of the vehicle;
  receiving, using the wireless transceiver, data packets from the target connected device indicative of a current state of charge of the target connected device;
  charging the target connected device from the power connector in accordance with the settings and the current state of charge; and
  displaying, in the HMI, a listing of a plurality of connected devices, the plurality of connected devices including the target connected device, where, for each of the plurality of connected devices the HMI displays a name of the respective connected device, and a configurable current flow that the respective connected device receives when being charged.

15. A non-transitory computer-readable medium comprising instructions for controlling charging of connected devices that, when executed by a controller of a vehicle, cause the vehicle to perform operations including to:

detect, using a wireless transceiver of a vehicle, presence of a target connected device;

receive, via a user interface presented to an HMI of the vehicle, settings indicative of how to charge the target connected device via a power connector of the vehicle;

receive, using the wireless transceiver, data packets from the target connected device indicative of a current state of charge of the target connected device; and charge the target connected device from the power connector in accordance with the settings and the current state of charge; and display, in the HMI, a listing of a plurality of connected devices, the plurality of connected devices including the connected device, where, for each of the plurality of connected devices the HMI displays a name of the respective connected device, the state of charge of the respective connected device, an indication of whether the connected device is currently being charged, and if the connected device is not currently being charged, a description of the settings that, when met, would cause the connected device to be charged.

16. The medium of claim 15, wherein the description of the settings that, when met, would cause the connected device to be charged includes the state of charge of the connected device below which charging of the connected device would be initiated.

17. The medium of claim 15, wherein the state of charge of the respective connected device further indicates the state of charge of the connected device above which charging of the connected device will be discontinued.

18. The medium of claim 15, further comprising instructions that, when executed by the controller, cause the controller to perform operations including to display, in the HMI, a settings indication corresponding to each of the plurality of connected devices in the listing, wherein responsive to being selected, the HMI displays options to configure aspects of charging of the respective connected device, the options including one or more of:
- a start time of day at which to begin charging the respective connected device,
- an end time of day at which to end charging the respective connected device,
- a minimum state of charge of the respective connected device below which to begin charging the respective connected device, or
- a maximum state of charge of the target connected device above which to begin charging the respective connected device.

19. The medium of claim 15, wherein the settings include a minimum state of charge of the target connected device below which to begin charging the target connected device, and further comprising instructions that, when executed by the controller, cause the controller to perform operations including to initiate the charge of the target connected device from the power connector responsive to the current state of charge of the target connected device being less than the minimum state of charge.

20. The medium of claim 15, wherein the settings include a maximum state of charge of the target connected device above which to begin charging the target connected device, and further comprising instructions that, when executed by the controller, cause the controller to perform operations including to discontinue the charge of the target connected device from the power connector responsive to the current state of charge of the target connected device being greater than the maximum state of charge.

21. A non-transitory computer-readable medium comprising instructions for controlling charging of connected devices that, when executed by a controller of a vehicle, cause the vehicle to perform operations including to:

detect, using a wireless transceiver of a vehicle, presence of a target connected device:

receive, via a user interface presented to an HMI of the vehicle, settings indicative of how to charge the target connected device via a power connector of the vehicle;

receive, using the wireless transceiver, data packets from the target connected device indicative of a current state of charge of the target connected device;

charge the target connected device from the power connector in accordance with the settings and the current state of charge; and display, in the HMI, a listing of a plurality of connected devices, the plurality of connected devices including the target connected device, where, for each of the plurality of connected devices the HMI displays a name of the respective connected device, and a configurable current flow that the respective connected device receives when being charged.

* * * * *